(12) United States Patent
Wilhelm et al.

(10) Patent No.: US 11,467,010 B2
(45) Date of Patent: Oct. 11, 2022

(54) METHOD FOR DETERMINING THE NECESSITY OF CLEANING AND/OR THE SUCCESS OF CLEANING

(71) Applicant: Analytik Jena AG, Jena (DE)

(72) Inventors: Thomas Wilhelm, Chemnitz (DE); Thomas Moore, Jena-Drackendorf (DE); Detlev Wittmer, Maulbonn (DE); Ulrich Hoefer, Freiburg (DE)

(73) Assignee: Analytik Jena AG, Jena (DE)

( * ) Notice: Subject to any disclaimer, the term of this patent is extended or adjusted under 35 U.S.C. 154(b) by 0 days.

(21) Appl. No.: 17/125,189

(22) Filed: Dec. 17, 2020

(65) Prior Publication Data

US 2021/0190553 A1   Jun. 24, 2021

(30) Foreign Application Priority Data

Dec. 20, 2019 (DE) ..................... 10 2019 135 589.3

(51) Int. Cl.
*G01D 11/24* (2006.01)
*G01N 27/28* (2006.01)

(52) U.S. Cl.
CPC ......... *G01D 11/245* (2013.01); *G01N 27/283* (2013.01)

(58) Field of Classification Search
CPC ........................... G01D 11/245; G01N 27/283
See application file for complete search history.

(56) References Cited

U.S. PATENT DOCUMENTS

| | | | | |
|---|---|---|---|---|
| 9,091,570 | B2* | 7/2015 | Pfauch | G01N 27/283 |
| 9,234,860 | B2* | 1/2016 | Pfauch | G01N 27/283 |
| 9,243,714 | B2* | 1/2016 | Wunderlich | F16K 11/0712 |
| 10,209,105 | B2* | 2/2019 | Schneider | G01N 27/283 |

FOREIGN PATENT DOCUMENTS

| | | | | |
|---|---|---|---|---|
| CA | 2659116 A1 * | 8/2008 | | G01N 21/01 |
| DE | 102005051279 A1 * | 5/2007 | | G01N 27/283 |
| DE | 102005051279 A1 | 5/2007 | | |
| DE | 102011080579 A1 | 2/2013 | | |
| DE | 102017126612 A1 * | 5/2019 | | G01N 21/255 |
| DE | 102017126612 A1 | 5/2019 | | |
| DE | 102018133411 A1 * | 6/2020 | | G01N 21/8507 |
| DE | 102018133411 A1 | 6/2020 | | |
| EP | 2557417 A1 * | 2/2013 | | G01D 11/245 |
| WO | WO-2007048821 A2 * | 5/2007 | | G01N 27/283 |
| WO | WO-2008028475 A2 * | 3/2008 | | G02B 21/24 |
| WO | WO-2014111498 A1 * | 7/2014 | | G01N 21/15 |

* cited by examiner

*Primary Examiner* — Jamel E Williams
(74) *Attorney, Agent, or Firm* — Christopher R. Powers; Endress+Hauser (USA) Holding Inc.

(57) ABSTRACT

The present disclosure includes a method for determining the necessity of a measure and/or the success of a measure in the case of a sensor in a retractable assembly, comprising the steps: moving the sensor in the direction of a service chamber of the retractable assembly; analyzing an attribute associated with the sensor, wherein the attribute is a state of at least a portion of the surface of the sensor and/or composition of a medium in the service chamber; and deriving measures from the analysis. The present disclosure also includes a system comprising a retractable assembly having a sensor and a corresponding analysis device.

13 Claims, 6 Drawing Sheets

METHOD FOR DETERMINING THE NECESSITY OF CLEANING AND/OR THE SUCCESS OF CLEANING

CROSS-REFERENCE TO RELATED APPLICATION

The present application is related to and claims the priority benefit of German Patent Application No. 10 2019 135 589.3, filed on Dec. 20, 2019, the entire contents of which are incorporated herein by reference.

TECHNICAL FIELD

The present disclosure relates to a method for determining the necessity of cleaning and/or the success of cleaning of a sensor in a retractable assembly. The present disclosure also relates to a retractable assembly having a sensor and a corresponding analysis device.

BACKGROUND

A great variety of retractable assemblies are offered and marketed by the Endress+Hauser corporate group, for example, under the name "Cleanfit CPA875." Information about such devices can be found on the applicant's website, for example with respect to the filing date under: http://www.endress.com/cpa875

Retractable assemblies are widely used in analytical measurement technology and process automation. They are used for removing sensors from the process, and thus from the medium, without interrupting the process, and for then reintroducing them into the process. The sensors are fastened in a dip tube and are moved axially by hand or automatically, for example, pneumatically, by means of a drive between a process position (measurement) and a service position (maintenance, calibration, flushing, probe exchange, etc.). These operations run within a certain time cycle. The sensors are used for measuring one or more physical or chemical process variables.

The field of use of retractable assemblies for measuring physical or chemical process variables of a medium, for example, a fluid, for example, a liquid, in process technology is many-faceted. Sensors are used to determine the process variables, wherein the sensors are, for example, pH sensors, conductivity sensors, optical or electrochemical sensors for determining a concentration of a substance contained in the medium to be monitored, such as $O_2$, certain types of ions, organic compounds, or the like.

If retractable assemblies are used for receiving the sensor for determining at least one process variable, the sensor can be checked, calibrated, cleaned and/or replaced in the service position, wherein the sensor is located in the so-called service chamber. So that the medium is not contaminated by the calibration, flushing or cleaning liquid, the service chamber is sealed off in the service position from the container in which the medium is located in such a way that no exchange of medium/liquid can take place. Usually, for this purpose, a seal is located at the medium-side end of the housing of the retractable assembly and, in interaction with a closure element on the dip tube, prevents an exchange of medium/liquid.

As mentioned above, this cleaning or flushing is usually time-controlled. Whether cleaning is even necessary is not checked. Nor is it determined whether cleaning was successful at all.

SUMMARY

The present disclosure is based on the object of determining whether a measure may be necessary for a sensor in a retractable assembly and—should the measure be necessary—checking it for success. In particular, it is the object, for example, to determine a possibly necessary cleaning of a sensor in a retractable assembly and—if cleaning is required—to check it for the success of cleaning.

The object is achieved by a method comprising the steps: moving the sensor towards a service chamber of the retractable assembly; analyzing an attribute associated with the sensor, wherein the attribute is a state of at least a portion of the surface of the sensor and/or composition of a medium in the service chamber; and deriving measures from the analysis.

The surface condition of the sensor is thus analyzed. For example, deposits (biofilms, dirt, erosions, etc.), material erosion or color changes, which could influence the sensor properties, are to be detected.

A check is made as to the necessity or the success of a measure and enables the optimization of the measure. In one embodiment, the measure is and the cleaning or the starting of a cleaning. The necessity or success of the cleaning can thus be checked. Information relating to the replacement and maintenance of the sensor is derived from the sensor state.

Furthermore, the constituents of the medium, which give information about the success of the cleaning, can be analyzed.

The checking of the success of the cleaning enables optimization of the cleaning process and also of the cleaning cycles, for example by closing a control loop. Information relating to the replacement, maintenance of the sensor, starting a cleaning cycle or further measurement is derived from the sensor state (see below).

Interruption of the process takes time and costs resources. By the claimed method, the point in time of an actual replacement or maintenance of the sensor can be better planned and controlled.

In one embodiment, the portion of the sensor is a membrane, diaphragm, filler opening for a bridge electrolyte, sensor shaft, glass shaft, optical measurement window, or electrode.

In one embodiment, the analysis already takes place during the movement of the sensor in the direction of the service chamber and thus a continuous analysis is carried out over a lateral measuring range on the sensor.

In one embodiment, the surface is analyzed by means of a grazing light incidence on the surface of the sensor in order to measure the reflection properties and/or by means of further spectral analyses.

In one embodiment, the medium is a cleaning liquid, flushing liquid or medium to be analyzed by the sensor, which enters the service chamber during the movement of the sensor.

One embodiment provides for the medium to be analyzed at a location remote from the retractable assembly.

In one embodiment, derivation of the measure comprises at least one of the steps of starting a cleaning cycle, replacing the sensor, maintaining the sensor, or further measurement.

The object is further achieved by a retractable assembly with at least one service chamber; a sensor which is arranged in the retractable assembly and is movable between a service position and a process position, wherein the sensor in the service position is in the service chamber; and an analysis device for analyzing an attribute associated with the sensor.

In one embodiment, the analysis device is a spectrometer, a fluorescence measuring device or a laser-based measuring device, in particular for measuring scattering or reflection. Such a spectrometer can thus also be a mass or atomic absorption spectrometer. Optical absorption spectrometers in the UV/VIS/NIR range, Raman spectrometers, turbidometers, nephelometers, reflectometers, refractometers or camera-based or hyperspectral inspection systems may be mentioned here as further examples. These can have lasers, LEDs or lamps as light sources. This list is not complete and is not intended to exclude optical measurement techniques, such as electrochemical sensors or molecular biological detection methods.

In one embodiment, the retractable assembly comprises at least one optical window onto the service chamber, in particular precisely one window, and the analysis device then analyzes the attribute via said window. The at least one optical window is arranged in a wall of the service chamber.

In one embodiment, the retractable assembly comprises at least two oppositely arranged optical windows onto the service chamber.

In one embodiment, the attribute is determined by means of transmission measurement through the service chamber.

In one embodiment, the two windows are arranged opposite each other, in particular in the case of transmission measurement. In one embodiment, the medium is measured past the sensor. In one embodiment, a measurement with grazing incidence is carried out at the sensor.

In one embodiment, the retractable assembly comprises at least two non-parallel optical windows onto the service chamber, in particular the two windows are arranged orthogonally to each other. In one embodiment, the medium is measured past the sensor. In one embodiment, a measurement with grazing incidence is carried out at the sensor.

In one embodiment, the attribute is determined by means of nephelometry or roughness or scattered light measurement on the sensor surface.

One embodiment provides that the retractable assembly comprises at least one flushing connection and that the analysis device analyzes the attribute via said connection.

BRIEF DESCRIPTION OF THE DRAWINGS

This is explained in more detail with reference to the following figures, which include.

In the figures, the same features are identified by the same reference signs.

DETAILED DESCRIPTION

"Top," "above," and related terms within the meaning of the present disclosure indicate facing away from the measuring medium 14. "Bottom," "below," and related terms within the meaning of the present disclosure indicate facing toward the measuring medium 14.

Figure 1:
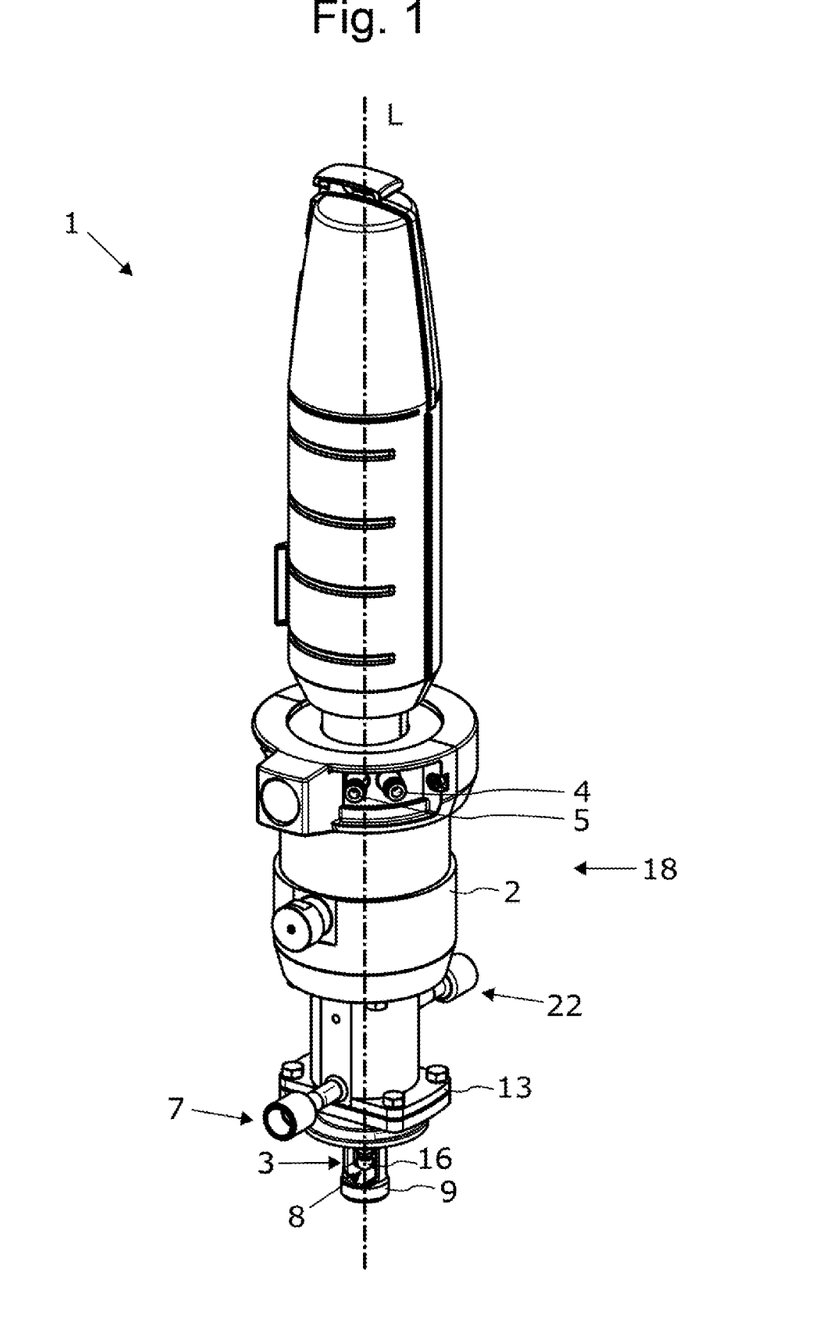
FIG. 1 shows a retractable assembly of the present disclosure.
Figure 2:
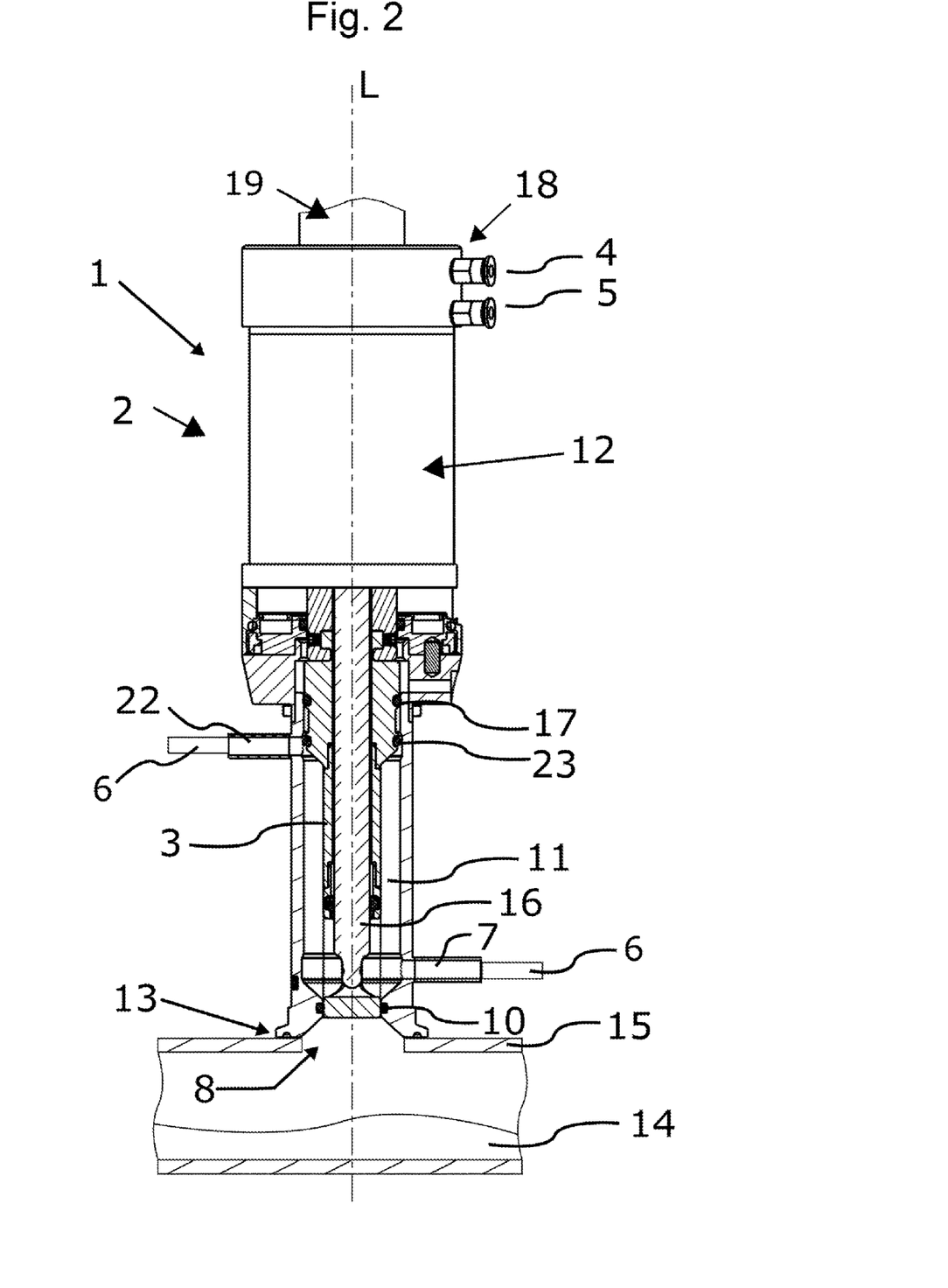
FIG. 2 shows a view of a retractable assembly of the present disclosure in cross-section.

The system of the present disclosure with the retractable assembly in its entirety has the reference numeral 30 and is shown in FIG. 1 and FIG. 2. The system 30 comprises a retractable assembly 1. The retractable assembly 1 consists of a substantially cylindrical housing 2 which can be connected to a container 15 by means of a connecting means 13. The connecting means 13 can be, for example, designed as a flange connection, made of, for example, stainless steel. However, other embodiments are possible. The measuring medium 14 to be measured is located in the container. The container 15 can be, for example, a tank, boiler, tube, pipeline or the like.

FIG. 1 shows the retractable assembly 1 in the process position. This is explained in more detail below. FIG. 2 shows the retractable assembly 1 in the service position.

A dip tube 3 is guided inside the housing 2. The system 30 also comprises a sensor 16. The sensor 16 is connected to the dip tube 3 by a receptacle, which is not described in greater detail, for example, by means of a screw connection. The sensor 16 within the meaning of the present disclosure includes sensors for measuring one or more physical or chemical process variables. These are, for example, pH value, also via an ISFET, redox potential, absorption of electromagnetic waves in the measuring medium 14, for example, with wavelengths within the UV, IR and/or visible ranges, oxygen, conductivity, turbidity, concentration of metal and/or non-metal materials or temperature. The sensor 16 has access to the measuring medium 14 through an opening 8 in the dip tube 3. In this case, the opening 8 is designed in such a way that it is open in the flow direction, that is, that the measuring medium 14 optimally flows to the sensor 16, especially, when the retractable assembly 1 is used in a pipeline.

The sensor 16 is connected to a cable 19. The cable, in turn, is connected to a transmitter, which is not shown.

The dip tube 3 can be produced from various materials. The prior art discloses dip tubes 3 made of steel or stainless steel. However, applications in which highly resistive materials are used are common, especially in the chemical industry. The dip tube 3 can thus also be made of a plastic, such as polyether ether ketone (PEEK), polytetrafluoroethylene (PTFA), a perfluoroalkoxy polymer (PFA), another plastic, or resistant metals, such as Hastelloy. A ceramic may also be used. Another option is the use of one or more coatings of the aforementioned polymers. The same applies to the housing 2.

The dip tube 3 is mounted in a manner axially displaceable in the direction of the measuring medium 14 or in the direction facing away from the measuring medium 14 along the central axis L. The dip tube 3 can be moved between the service position (shown in FIG. 2) retracted into the housing 2 and the process position (shown in FIG. 1) extended out of the housing 2. The measurement takes place in the process position. The probe or sensor 16 has access to the measuring medium 14 through a cage-like opening 8 in the dip tube 3. A wide variety of service tasks, such as cleaning or calibration, are performed in the service position.

Flushing/cleaning/calibration and/or sterilization media can be admitted into the service chamber 11 through the connection 7, see below). The flushing/cleaning/calibration and/or sterilization media can be liquid or gaseous. The liquid can drain again through the corresponding connection 22, which can be positioned at both an axial and radial offset from the connection 7. The flushing direction can also be reversed.

The displacement of the dip tube 3 is performed by a drive device 18 located above the service chamber 11. The drive 18 is part of the housing 2. The housing 2 comprises a housing interior 12. The movement is carried out, for example, by an automatic drive, such as by supply energy. If supply energy is introduced through the connection 4, the dip tube 3 moves from the service position into the process position. The connection 5 then serves as an outlet. If supply energy is introduced through the connection 5, the dip tube 3 moves from the process position into the service position. The connection 4 then serves as an outlet. Pneumatic, hydraulic or electric drives are, for example, known from the prior art. The retractable assembly shown uses a pneumatic drive. The process of displacing the dip tube 3 is explained in more detail below.

A piston (not shown) is firmly connected to or is an integral part of the dip tube 3. The piston is designed, for example, as an annular piston and forms part of the drive 18. The piston divides the drive portion of the housing interior 12 into an upper region and a lower region. The dip tube 3 can be moved via the connection 4 into the upper region and via a connection 5 into the lower region above or below the piston: when compressed air is brought into the upper region through the connection 4, the dip tube 3 moves in the direction of the medium 14, wherein air from the lower region simultaneously flows through the connection 5. Air can also be actively drawn from the lower region in order to support the movement in the direction of the medium 14. When compressed air is brought into the lower region through the connection 5, the dip tube 3 travels away from the medium 14, wherein air from the upper region simultaneously flows through the connection 4. Air can also be actively drawn from the upper region in order to support the movement.

It is self-evident that corresponding seals (not shown) need to ensure that compressed air does not escape and is only conducted through the connections 4, 5.

The connections 4, 5 are attached laterally to the housing 2. The connection 4 can be located above the piston (dip tube 3 in service position), the connection 5 can be located below the piston (dip tube 4 in process position). It is conceivable for both inlets 4, 5 to be located on the housing 2 above or below the piston and, for proper functioning, for a line to be guided into the respective other region in the interior of the housing 2. FIG. 1 shows that connections 4, 5 are arranged next to one another above the piston (service position). FIG. 2 shows them arranged one above the other. A corresponding line for guiding the connection 5 into the lower region is located in the interior of the housing 2. The connections 4, 5 do not necessarily have to be located in the same frontal plane.

If the dip tube 3 is in the service position, a portion of the dip tube 3, for example, the sensor 16, is located in the service chamber 11 for flushing, cleaning, calibrating, sterilizing, etc. The closure element 9 for process separation is located at the lower end of the dip tube 3. The closure element 9 seals off the service chamber 11 from the process, and thus from the measuring medium 14. The measuring medium may be hot, toxic, caustic or otherwise harmful to humans and the environment. It must therefore be ensured that the closure element 9 seals reliably and permanently. For this purpose, various sealing devices are attached to the housing 2; for example, one or more medium seals 10 are used. In the depicted embodiment, the medium seal 10 is arranged on the housing 2. Alternatively, the medium seal 10 may be arranged on the lower end region of the dip tube 3 (not shown).

At least one seal 17, in the example two seals 17, 23, is arranged on the upper region of the dip tube 3. The seal 17, 23 seals off the service chamber 11 from the drive device 18, particularly when moving from the service position to the process position and vice versa. In the service position, the upper seal 17 is arranged above the connection 22 and the lower seal 23 is arranged at the same height or below the connection 22.

An analysis device 6 is connected to the inlet 7 and/or the outlet 22 (see FIG. 2). If the sensor 16 moves in the direction of the service chamber 11, then an analysis of an attribute associated with the sensor 16 takes place, wherein the attribute is a state of at least a portion of the surface of the sensor 16 and/or a composition of a medium in the service chamber 11. Finally, a measure is derived therefrom.

In the analysis, it is checked whether the attribute is within a certain parameter range. If the attribute is outside a tolerance range, a different measure must be taken than when the attribute is within the tolerance range.

The sensor 16 analyzes either a membrane, diaphragm, filler opening for a bridge electrolyte, sensor shaft, glass shaft, optical measurement window, and/or electrode.

This analysis takes place either during the movement of the sensor 16, for example, upward movement, when the sensor 16 moves into the service position (alternatively, when it moves into the process position). Alternatively, this occurs when the sensor 16 is located in the service chamber 11.

The "medium" is, for example, a measuring medium 14 which is transported upwards during the movement or is a calibration, flushing or cleaning liquid.

The analysis device 6 is, for example, a device for the chemical, physical or biological determination of the composition of the medium.

The analysis device 6 can also be an optical analysis device, for example by means of grazing incidence of light onto the surface of the sensor 16 for measuring the reflection properties or by means of further spectral analyses; see also below, for example, FIG. 4c. For this purpose, for example, a laser can be used which is directed at the sensor 16 at a shallow angle.

In one embodiment, the retractable assembly 1 with the service chamber 11 comprises one or more windows 20 in the wall 11a of the service chamber 11, which will be discussed below. "Window" shall be understood to mean not only plane-parallel plates but also prismatic, spherical, aspherical or free-formed transparent bodies, e.g. also matched to the optical refractive index of the medium. The combination of sensor 1 and wall 11a need not be concentric.

Figure 3A:
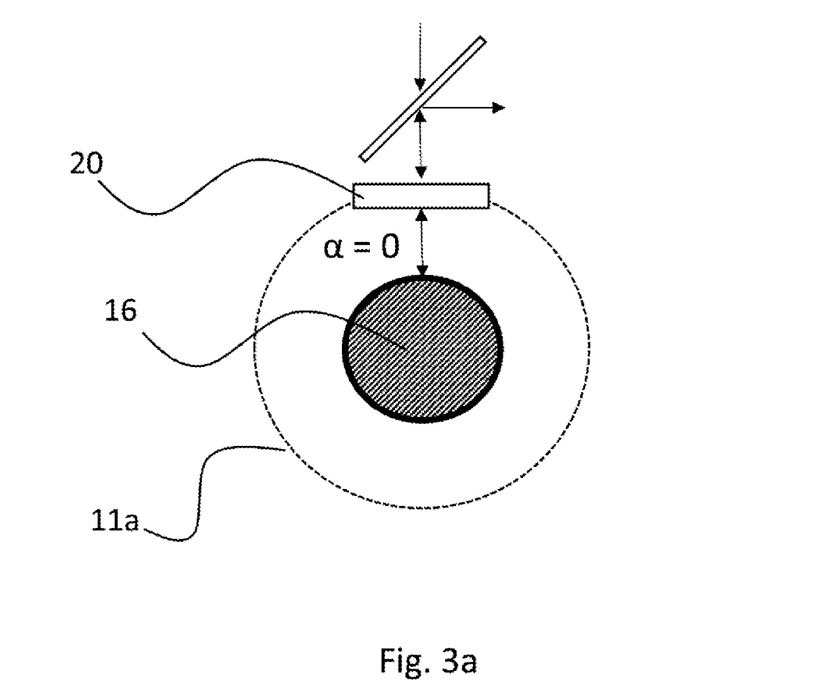
FIGS. 3a and 3b show a service chamber of the retractable assembly in cross-section viewed from above with one window in two variants.
Figure 3B:
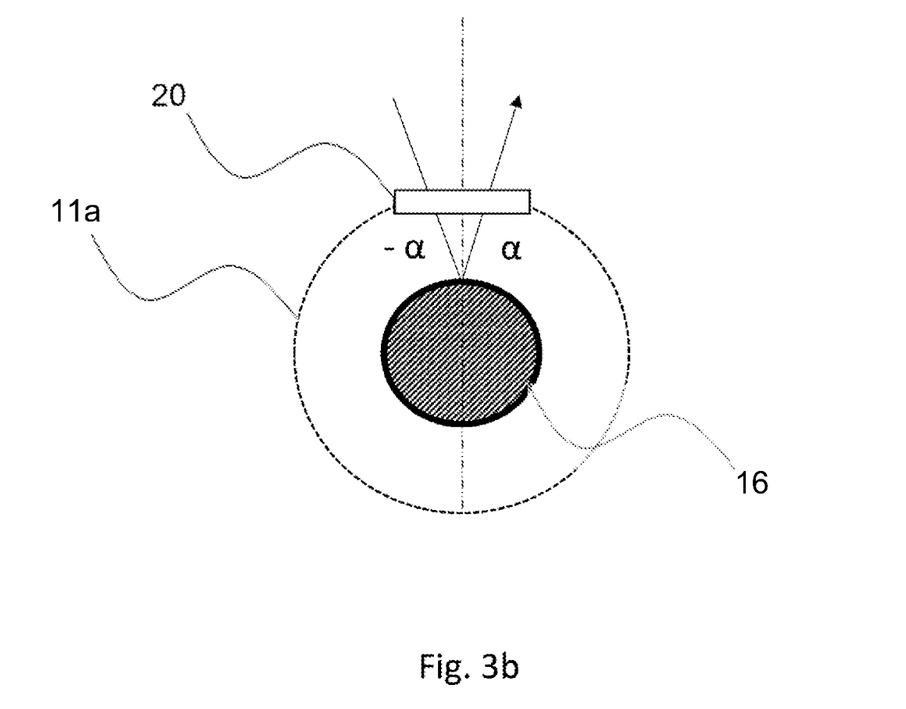

FIG. 3a shows the service chamber 11 of the retractable assembly 1 in cross-section viewed from above with one window 20. Light enters the interior of the service chamber 11 through the window 20 and is reflected at the sensor 16. Since irradiation is at an angle of incidence $\alpha=0°$, the light is reflected back at precisely the same angle. A semi-permeable mirror can direct the reflected light back onto the analysis device 6. In the variant in FIG. 3b, irradiation is at an angle of incidence of $\alpha \neq 0°$.

Figure 4A:
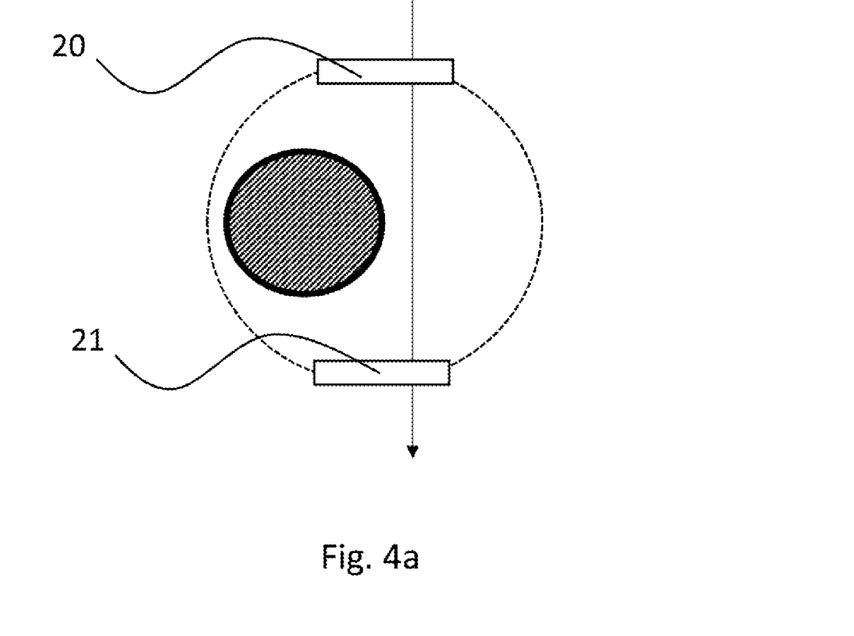
FIGS. 4a, 4b and 4c show a service chamber of the retractable assembly in cross-section viewed from above with two parallel windows in three variants.
Figure 4B:
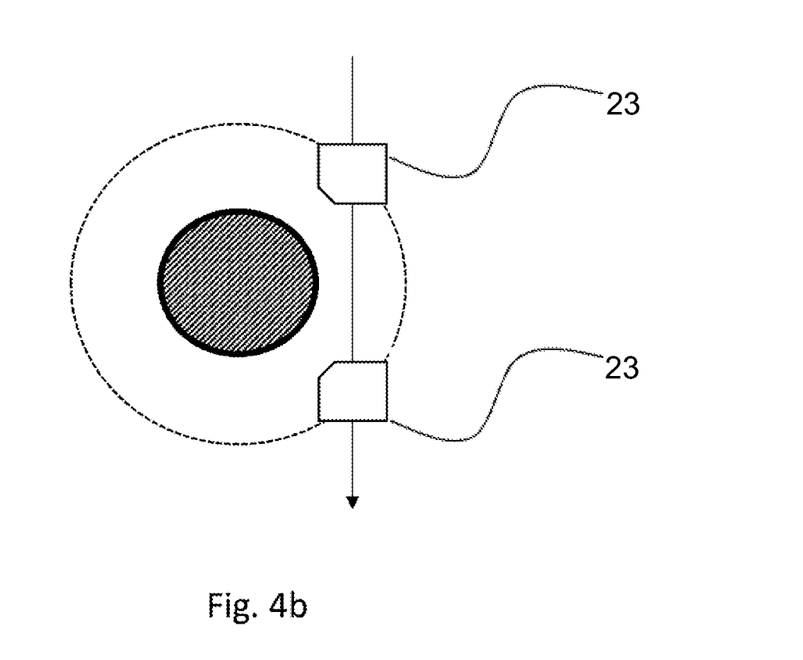
Figure 4C:
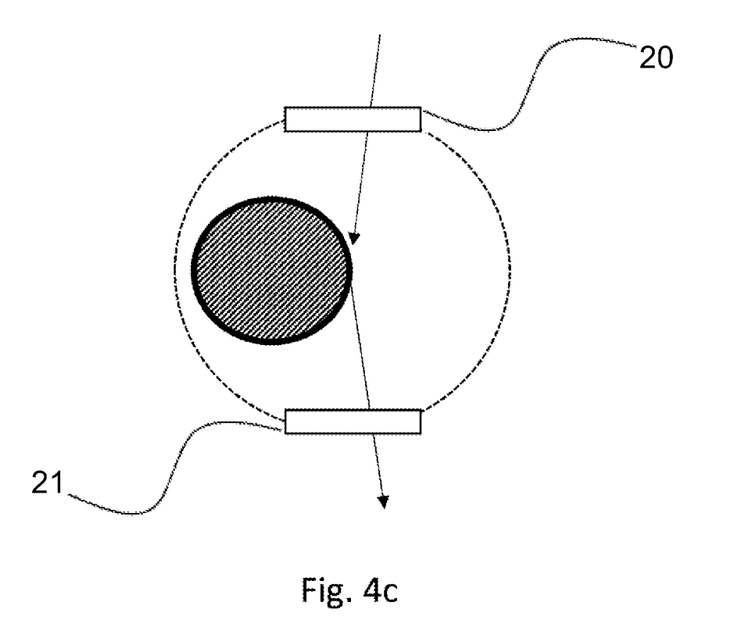

FIG. 4a shows the service chamber 11 in cross-section viewed from above with two parallel windows 20, 21. Light shines through the service chamber and a connected analysis device detects the transmission through the medium in the service chamber 11. In the variant in FIG. 4b, not only is a plane-parallel plate used as a window, but also a free-formed body transparent to the irradiating light 23. Here, too, an oblique incidence of the light is possible; see FIG. 4c.

Figure 5A:
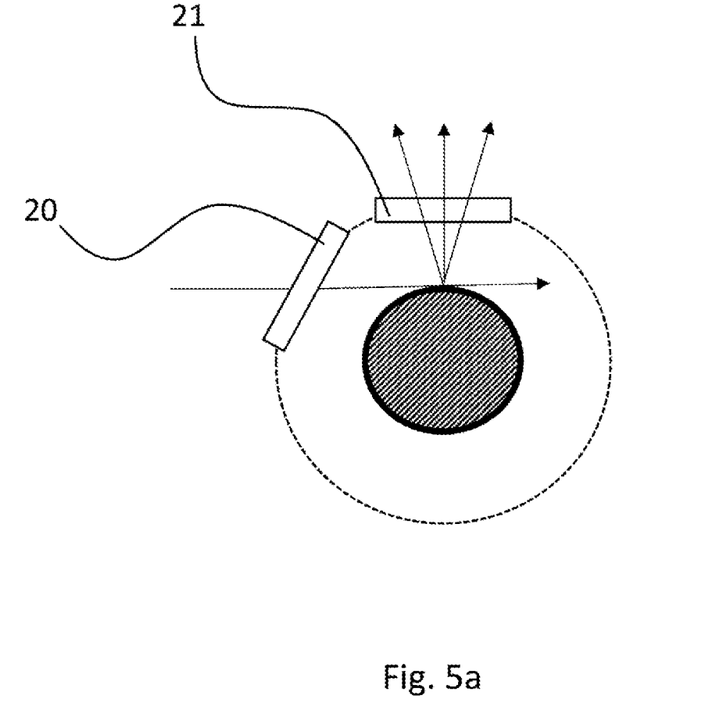
FIGS. 5a and 5b show a service chamber of the retractable assembly in cross-section viewed from above with two non-parallel windows in two variants.
Figure 5B:
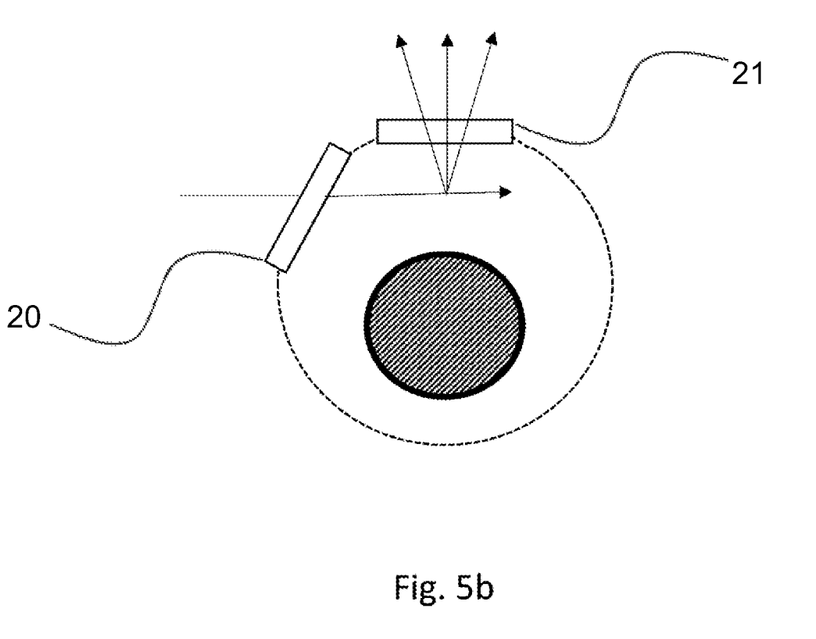

FIG. 5a shows the service chamber 11 in cross-section viewed from above with two non-parallel windows 20, 21. In this case, the sensor 16 is grazed and, for example, the scattering at the angle of 90° is measured. In the variant in FIG. 5b, the sensor 16 is not grazed.

The medium can be analyzed at a location remote from the retractable assembly 1.

The starting of a cleaning cycle, the replacement of the sensor 16, maintenance of the sensor 16 or further measurement (for example, if the analysis does not show any deviation from the setpoint value) can be considered as a measure to be derived from the analysis. Calibration and/or adjustment can also be carried out as maintenance.

This results in additional information regarding the state of the medium, for example by means of spectroscopic methods, or regarding the state of the flushing liquid. This enables the analysis of the content of possible constituents of coatings or of the sensor material. Furthermore, additional information is obtained regarding the state of different active regions of the sensor surface. Finally, a determination of the integrity or analysis of the entire sensor surface can be achieved.

The invention claimed is:

1. A method for determining necessity of a measure and/or success of a measure for a sensor in a retractable assembly, wherein the sensor is configured to measure one or more physical or chemical process variables of a process medium, the method comprising:
moving the sensor in a direction of a service chamber of the retractable assembly;
analyzing an attribute associated with the sensor using an analysis device, not the sensor, wherein the attribute is a state of at least a portion of a surface of the sensor and/or a composition of a service medium in the service chamber; and
deriving the measure based on the analysis of the analysis device.

2. The method of claim 1, wherein the portion of the sensor is a membrane, a diaphragm, a filler opening for a bridge electrolyte, a sensor shaft, a glass shaft, an optical measuring window, or an electrode.

3. The method of claim 1, wherein the analyzing is performed continuously during the moving of the sensor in the direction of the service chamber.

4. The method of claim 1, wherein the service medium is cleaning liquid, flushing liquid or, at least in part, the process medium to be analyzed by the sensor, which enters the service chamber during the moving of the sensor.

5. The method of claim 1, wherein the analyzing is performed at a location remote from the retractable assembly.

6. The method of claim 1, wherein the deriving of the measure comprises at least one of the steps: starting a cleaning cycle, replacing the sensor, maintenance of the sensor, and further measurement.

7. A system for determining necessity of cleaning and/or success of cleaning of a sensor in a retractable assembly, the system comprising:
a retractable assembly including at least one service chamber;
a sensor disposed in the retractable assembly such that the sensor is movable between a service position and a process position, wherein in the service position the sensor is within the service chamber, and wherein the sensor is configured to measure one or more physical or chemical process variables of a process medium; and
an analysis device configured to analyze an attribute associated with the sensor, wherein the attribute is a state of at least a portion of a surface of the sensor and/or a composition of a service medium in the service chamber.

8. The system of claim 7, wherein the analysis device is a spectrometer, a fluorescence measuring device, or a laser-based measuring device adapted to operate upon measuring scattering or reflection.

9. The system of claim 7, wherein the retractable assembly comprises at least one optical window into the service chamber, and the analysis device is configured to determine the attribute via the at least one window.

10. The system of claim 9, wherein the at least one optical window is one, single window.

11. The system of claim 9, wherein the retractable assembly comprises at least two oppositely arranged optical windows into the service chamber.

12. The system of claim 9, wherein the retractable assembly comprises at least two non-parallel optical windows into the service chamber, wherein the at least two windows are arranged orthogonally to one another.

13. The system of claim 7, wherein the retractable assembly comprises at least one flushing connection, and the analysis device is configured to determine the attribute via the flushing connection.

\* \* \* \* \*